United States Patent [19]
Bjur et al.

[11] Patent Number: 6,068,689
[45] Date of Patent: May 30, 2000

[54] METHOD OF PRODUCING A VISCOSE SOLUTION

[75] Inventors: Kent Bjur, Stenungsund; Anders Cassel, Myggenas; Ingemar Uneback, Svenshogen, all of Sweden; Arkady Stavtsov, Kiev, Ukraine

[73] Assignee: Akzo Nobel Surface Chemistry, AB, Stenungsund, Sweden

[21] Appl. No.: 09/419,458

[22] Filed: Oct. 15, 1999

Related U.S. Application Data

[63] Continuation of application No. PCT/SE98/00336, Feb. 25, 1998.

[30] Foreign Application Priority Data

Apr. 18, 1997 [SE] Sweden ................... 9701447

[51] Int. Cl.$^7$ ...................................................... C08L 1/24
[52] U.S. Cl. ................................. 106/166.8; 106/166.42; 106/166.5; 106/166.52
[58] Field of Search ............................. 106/166.8, 166.5, 106/166.52, 166.42

[56] References Cited

U.S. PATENT DOCUMENTS 4,025,353  5/1977  Wahlen .................................. 106/165

FOREIGN PATENT DOCUMENTS

| 0 124 935 | 11/1984 | European Pat. Off. .......... C08B 9/00 |
| 29 41 624 | 5/1980 | Germany ......................... C08B 1/08 |
| 830820 | 3/1960 | United Kingdom . |

OTHER PUBLICATIONS

Prof. Dr.–Ing., A.K. Stavtsow, Chemical Fibers International, Possibilities of using radiation modified cellulose in viscose production, vol. 46 (Apr. 1996,) p. 92–94.

Drozdovskii V. N., Meleshevich A. P., Stavtsov A. K., Derwent, Production of viscose from cellulose—by irradiation with accelerated electrons, treating with sodium hydroxide solution, cooling, treating with carbon sulphide and dissolution, SU1669916, (Aug. 15, 1991).

*Primary Examiner*—David Brunsman
*Attorney, Agent, or Firm*—Lainie E. Parker

[57] ABSTRACT

The invention is a method of producing a viscose solution by a) irradiating α-cellulose with ionizing particles,
b) mercerizing the irradiated α-cellulose with alkali,
c) xanthating the irradiated mercerized α-cellulose with an amount less than 28% of carbon disulfide based on the weight of α-cellulose, and
d) dissolving the xanthated α-cellulose in an aqueous alkali solution;

and adding at least one surfactant before or after one or more steps of the method. The surfactant is chosen from the group consisting of a water soluble nonionic and a cationic surfactant, and it is added to the process in an amount of 0.02–5% by weight of the amount of α-cellulose. The viscose solution has suitable properties for the production of regenerated cellulose fibers.

11 Claims, No Drawings

METHOD OF PRODUCING A VISCOSE SOLUTION

RELATED APPLICATION

This application is a continuation of PCT/SE98/00336 filed Feb. 25, 1998.

FIELD OF THE INVENTION

The present invention relates to a method of improving the quality of a viscose solution derived from irradiated α-cellulose and the use of certain surfactants therefor.

BACKGROUND OF THE INVENTION

When producing regenerated cellulose fibers by the viscose method, a reduction of chemical substances used in the process, such as carbon disulphide, will probably be necessary in the future for both environmental and economical reasons. In a traditional viscose process, the amount of carbon disulphide added in the process is between 30 and 36% by weight of the α-cellulose. To recover the outlet of carbon disulphide into the air or water is both difficult and costly.

One of the more promising ways to reduce the consumption of carbon disulphide in the viscose process and to maintain or improve good economy are to use highly reactive cellulose obtained by irradiation with ionizing particles of high energy. It is well known that the higher the reactivity of the cellulose, the lower the amount of carbon disulphide required. For example, the patent publication DE-A-2 941 624 describes a method of producing viscose from the pulp irradiated with electron beams. In the patent, it is stated that a viscose solution is produced by using a content of 24–28% by weight of carbon disulphide based on the α-cellulose at the xanthation instead of the conventional 30–36% by weight. The α-cellulose content and the sodium hydroxide content were 8% and 5.8% respectively based on the weight of the viscose solution.

The Russian patent 1 669 916 also describes a method of producing viscose from irradiated α-cellulose. In the process, the xanthation is performed by using 10–15% by weight of carbon disulphide. The viscose produced contained 8.4% by weight of α-cellulose and 6.4% by weight of sodium hydroxide.

The properties of the viscose solutions prepared from irradiated cellulose with low amounts of carbon disulphide differ significantly from the properties of conventional viscose solutions. Thus, the viscose solution of the Russian patent has a low degree of etherification ($cs_2$ is from 22 to 25 instead of from 45–50), a low amount of by-products (1.5–2.5% by weight instead of from 10–14% by weight), a low maturity index (9–12 ml measured by 1 N $NH_4Cl$ instead of 18–21 ml), a high viscosity (120–135 sec measured by a falling ball instead of 50–60 sec).

However, regenerated cellulose fibers produced from viscose solutions obtained from irradiated α-cellulose exhibit unsatisfactory tensile strength. Thus, the journal "Chemical Fibers International" 1996 reports that it is possible to produce viscose fibers with tensile strength of 190–200 m N/tex and 18–20% elongation from irradiated α-cellulose with low amounts of carbon disulphide. Better results are not possible to achieve due to the properties of the viscose solution itself.

The objectives of the present invention are to provide an improved process for the production of a viscose solution in relationship to the traditional viscose method from an environmental point of view and to produce a viscose solution with suitable properties for the production of regenerated fibers. For example the spinnability of the viscose solution and the strength of the fibers are to be improved.

SUMMARY OF THE INVENTION

The invention is a method of producing a viscose solution by a) irradiating α-cellulose with ionizing particles,
b) mercerizing the irradiated α-cellulose with alkali,
c) xanthating the irradiated mercerized α-cellulose with an amount less than 28% of carbon disulphide based on the weight of α-cellulose, and
d) dissolving the xanthated α-cellulose in an aqueous alkali solution;

and adding at least one surfactant before or after one or more steps of the method. The surfactant is chosen from the group consisting of a water soluble nonionic and a cationic surfactant, and it is added to the process in an amount of 0.02–5% by weight of the amount of α-cellulose.

DETAILED DESCRIPTION OF THE INVENTION

It has now been found that the objectives of the invention can be achieved by producing a viscose solution by using irradiated α-cellulose and low amounts of carbon disulphide combined with the addition of certain surfactants. In more detail the present invention relates to a method of producing a viscose solution by a) irradiating an α-cellulose with ionizing particles,
b) mercerizing the irradiated α-cellulose with alkali,
c) xanthating the irradiated mercerized α-cellulose with an amount less than 28% of carbon disulphide based on the weight of α-cellulose, and
d) dissolving the xanthated α-cellulose in an aqueous alkali solution, and adding at least one surfactant before or after one or more steps of the method. The surfactant is chosen from the group consisting of a water soluble nonionic and a cationic surfactant, and it is added to the process in an amount of 0.02–5% by weight of the amount of α-cellulose. The method results in a viscose solution having improved quality in comparison with the corresponding viscose solutions produced without the use of the surfactants. The improvements comprise higher purity, lower viscosity and better filterability and thereby better spinnability. Regenerated cellulose fibers produced from the viscose solutions obtained by the method according to the invention exhibit essentially higher tensile strength than the prior known viscose solutions obtained when using low amounts of carbon disulphide.

When using non-irradiated cellulose and 30–36% of carbon disulphide based on α-cellulose, surfactants are widely used in order to improve the properties of viscose solutions and viscose fibers. It is established that the effect of the surfactants on the fiber quality is exhibited at relatively high content of by-products. Usually, in such a viscose solution the amount of by-products is in the range of 10–14% of the amount of α-cellulose.

Surprisingly, it has now been found that even in a viscose solution with so low amount of by-products as in the range of from 1.5 to 2.5% by weight of the α-cellulose, an essential improvment can be obtained by adding certain surfactants during the process. The surfactants may be added at any stage in the viscose process. For example, spraying an aqueous solution of the surfactant on the α-cellulose after the irradiation, but before the mercerization, is preferred, although it is also possible to add the surfactant during the mercerization step or during the dissolving step or to add it to the cellulose before the irradiation.

The nonionic and cationic surfactants suitable for use in the method normally contain a hydrocarbon group having 6–24, preferably 6–14 carbon atoms. Suitable examples of nonionic surfactants are ethoxylates, derived from alcohols, phenols and diols. Suitably the cationic surfactants are ethoxylated and contain at least one tertiary ammonium group. Examples are ethoxylated mono- or dialiphatic amines as well as ethoxylates of aliphatic polyamines and ethoxylates of acyl-substituted polyamine compounds.

In addition to these surfactants it is also possible to add certain solubilising agents, such as diethylene glycol and polyethylene glycols.

The viscose solution of the present invention, when used in the production of generated cellulose fibers, also contributes to a better fiber quality, such as an increased tensile strength. A suitable aqueous viscose solution to be used in formation of regenerated fibers contains 8–10% by weight of α-cellulose, 5–6% by weight of alkali, 8–28, preferably 10–25% by weight of carbon disulphide based on the α-cellulose content and 0.02–5% by weight of a surfactant chosen from the group consisting of a water-soluble nonionic and/or cationic surfactant based on the weight of α-cellulose and has a filterability above 175 ccm/10 min, preferably above 200 ccm/10 min defined by the volume of the viscose solution filtered through a metal net filter according to N0071, USSR State Standard 3584-53, with 71 μm meshes and a diameter of 38 mm under a pressure of 300 mm of the viscose solution for 10 minutes. The wire diameter in the net is 0.055 mm, the number of wires is 800 per dm, the number of meshes is 6400 per cm$^2$ and the size of mesh is 0.071 mm.

The invention is further illustrated by the following examples.

COMPARISON EXAMPLE

α-cellulose was irradiated by accelerated electrons in a dose of 10 kGrey. The irradiated α-cellulose having a DP of 440 was treated with a 16% by weight aqueous solution of sodium hydroxide at 19° C. for 70 minutes. The alkaline α-cellulose obtained was pressed up to 2.85 fold weight and then shredded for 120 minutes at the temperature of 10° C. and loaded into the xanthator.

Into the xanthator 15–16% of CS$_2$ based on the α-cellulose weight in the alkaline cellulose were introduced. The xanthation took place for 150 minutes at a temperature from 15 to 20° C. Thereafter, the xanthate was dissolved in a dissolver with a propeller-type mixer (350 rpm) for 3 hours at 10° C. during the addition of an aqueous alkaline solution.

The viscose solution obtained contained 9.0% by weight α-cellulose and 5.6% by weight of sodium hydroxide and 15% of carbon disulphide based on the weight of α-cellulose and exhibited the following properties.

| | |
|---|---|
| Viscosity (falling ball, sec) | 135 |
| Maturity (1N NH$_4$Cl, ml) | 9.1 |
| Undissolved particles (pieces) | 1.1 |
| Filterability, cm$^3$ per 10 min. | 114 |
| Spinnability | 320 |

The amounts of undissolved particles were defined under a microscope (×200) at 10 visual fields and an average value was calculated. Particles larger than 15 microns were registered. The filterability was defined by the amounts of cm$^3$ of viscose filtered through a metal filter (a net according to N0071 USSR State Standard 3584-53, with 71 μm meshes and a diameter of 38 mm) for 10 minutes. The viscose column above the filter was maintained 300 mm high. The viscose spinnability was defined by the method of maximal stretching directly after the spinneret.

EXAMPLE 1

Example 1 was carried out similarly to the Comparison example, except that during the mercerizing of the irradiated α-cellulose a surfactant in accordance with table 1 was added in an amount of about 2 kg per tonne of α-cellulose into the mercerizing alkali.

EXAMPLE 2

Example 2 was carried out similarity to the Comparison example, except that during the dissolving of a xanthate a surfactant in accordance with table 1 was added in an amount of about 2 kg per 1 tonne of α-cellulose to the aqueous alkali solution used for the dissolving.

EXAMPLES 3–7

Examples 3–7 were carried out similarity to the Comparison example, except that during mercerizing a surfactant according to table 1 was added to the mercerizing alkali at an amount of 2 kg per 1 tonne of irradiated cellulose and another 2 kg of the surfactant per tonne irradiated α-cellulose was added to the dissolving aqueous alkali solution.

EXAMPLE 8

Example 8 was carried out similarily to the Comparison example, except that a surfactant according to table 1 was applied onto the irradiated α-cellulose prior to mercerization in an amount of 1 kg per 1 tonne of cellulose by spraying a water solution with a weight ratio between the surfactant and the water of 1 to 10.

EXAMPLES 9–13

Example 9–13 were carried out similarily to Example 4, except that a surfactant in accordance with table 1 was applied in an amount of 2 kg per 1 tonne of α-cellulose.

EXAMPLE 14

Example 14 was carried out similarity to Example 4, except that a surfactant according to table 1 was applied in an amount of 4 kg per 1 tonne of α-cellulose.

EXAMPLE 15

Example 15 was carried out similarity to Example 5, except that a surfactant according to table 1 was applied by spraying a water solution with a weight ratio between the surfactant and the water of 1 to 600.

Surfactants and test results

The following surfactants were used in the Examples.

| Designation | Surfactant |
|---|---|
| A | Coco fatty amine + 11 EO |
| B | 90% phenol + 15 EO and 10% polyethylene glycol (2000) |
| C | Ethoxylated condensate of tall fatty acid and polyamine |
| D | $C_{12-14}$-alkyl ether diol + 20 EO |
| E | 90% of A and 10% dioctylamine + 10 EO |

The viscose solutions manufactured in Examples 1–15 were tested with regard to viscosity, maturity, filterability, undissolved particles and spinnability in the same manner as in the Comparison example. The following results were obtained.

TABLE 1

| Examples | Surfactant Type | kg/ton α-cellulose | Place of addition | Spray factor, kg surfactant/kg water | Visc.(s) | Maturity (ml) | Filter-ability (ccm/10 min) | Particles (pieces) | Spinn-ability (%) |
|---|---|---|---|---|---|---|---|---|---|
| Comparison | — | — | — | — | 135 | 9.1 | 114 | 1.1 | 320 |
| 1 | E | 2 | Merc. | — | 101 | 10.0 | 190 | 0.5 | 385 |
| 2 | E | 2 | Diss. | — | 100 | 8.7 | 180 | 0.6 | 370 |
| 3 | A | 2 | Merc. | — | 100 | 8.5 | 180 | 0.7 | 360 |
|   |   | 2 | Diss. |   |   |   |   |   |   |
| 4 | B | 2 | Merc. | — | 102 | 9.3 | 185 | 0.7 | 370 |
|   |   | 2 | Diss. |   |   |   |   |   |   |
| 5 | C | 2 | Merc. | — | 100 | 9.7 | 180 | 0.6 | 370 |
|   |   | 2 | Diss. |   |   |   |   |   |   |
| 6 | D | 2 | Merc. | — | 108 | 9.5 | 200 | 0.4 | 385 |
|   |   | 2 | Diss. |   |   |   |   |   |   |
| 7 | E | 2 | Merc. | — | 101 | 10.1 | 195 | 0.5 | 385 |
|   |   | 2 | Diss. |   |   |   |   |   |   |
| 8 | E | 1 | Spray | 1:10 | 101 | 10.7 | 205 | 0.4 | 390 |
| 9 | A | 2 | Spray | 1:10 | 101 | 9.7 | 210 | 0.5 | 380 |
| 10 | B | 2 | Spray | 1:10 | 98 | 10.3 | 215 | 0.4 | 385 |
| 11 | C | 2 | Spray | 1:10 | 100 | 9.8 | 200 | 0.4 | 380 |
| 12 | D | 2 | Spray | 1:10 | 105 | 10.0 | 220 | 0.3 | 400 |
| 13 | E | 2 | Spray | 1:10 | 100 | 10.9 | 230 | 0.2 | 410 |
| 14 | E | 4 | Spray | 1:10 | 95 | 11.1 | 235 | 0.2 | 410 |
| 15 | E | 2 | Spray | 1:600 | 70 | 13.4 | 320 | 0.1 | 450 |

From the results it is evident that the addition of a nonionic or cationic surfactant in the manufacturing process improves the quality and spinnability of the viscose solutions.

EXAMPLE 16

Some of the viscose solutions manufactured in the Examples and the Comparison example were subjected to a spinning process performed at a spinning rate of 70 m/minute. The following results were obtained.

TABLE 2

| Viscose solution | Linear density | Tensile strength mM/tex | Elongation at break % |
|---|---|---|---|
| Comparison | 0.17 | 200 | 17.5 |
| Example 3 | 0.17 | 240 | 18.0 |
| Example 4 | 0.17 | 220 | 17.9 |
| Example 5 | 0.17 | 230 | 17.8 |
| Example 7 | 0.17 | 252 | 18.1 |

From the results it is evident that the improved quality of the viscose solution also results in an improvment of the regenerated cellulose fiber properties.

What is claimed is:

1. A method of producing a viscose solution comprising the steps of:

a) irradiating α-cellulose with ionizing particles,
   b) mercerizing the irradiated α-cellulose with alkali,
   c) xanthating the irradiated mercerized α-cellulose with an amount less than 28% of carbon disulphide based on the weight of α-cellulose, and
   d) dissolving the xanthated α-cellulose in an aqueous alkali solution;

and a step of adding, during the method, at least one surfactant selected from the group consisting of a water-soluble nonionic and a cationic surfactant in an amount of 0.02–5% by weight of the amount of α-cellulose.

2. The method in accordance with claim 1, wherein the amount of carbon disulphide is from 8–25% by weight of the amount of α-cellulose.

3. The method in accordance with claim 1, wherein the amount of surfactant is from 0.05 to 1% by weight of the amount of α-cellulose.

4. The method in accordance with claim 1, wherein the surfactant is a nonionic or cationic surfactant having a hydrocarbon group of 6–24 carbon atoms.

5. The method in accordance with claim 1, wherein the surfactant is added to irradiated α-cellulose prior to the step of mercerizing.

6. The method in accordance with claim 1, wherein the surfactant contains an hydrocarbon group with 6–14 carbon atoms.

7. The method in accordance with claim 1, wherein the surfactant is a nonionic ethoxylate of an alcohol, phenol or diol compound.

8. The method in accordance with claim 1, wherein the surfactant is an ethoxylated mono- or dialiphatic monoamine containing at least one aliphatic tertiary ammonium group.

9. The method in accordance with claim 1, wherein the surfactant is selected from the group consisting of an ethoxylated aliphatic polyamine and an ethoxylated acyl-substituted polyamine, and the surfactant contains at least one aliphatic tertiary ammonium group.

10. A viscose solution, comprising 8–10% by weight of α-cellulose, 5–6% by weight of alkali, 10–25% by weight of carbon disulphide based on the weight of α-cellulose and 0.02–5% by weight of at least one surfactant selected from the group consisting of a water-soluble nonionic and a cationic surfactant based on the weight of α-cellulose, the viscose solution having a filterability of above 175 ccm defined by the volume of the viscose solution filtered through a metal net filter according to N0071, USSR State Standard 3584-53, with 71 μm meshes and a diameter of 38 mm, under a pressure of 300 mm for 10 minutes.

11. A method of producing a cellulose fiber, comprising forming said fiber from a viscose solution containing 8–10% by weight of α-cellulose, 5–6% by weight of alkali, 10–25% by weight of carbon disulphide based on the weight of α-cellulose and 0.02–5% by weight of at least one surfactant selected from the group consisting of a water-soluble nonionic and a cationic surfactant based on the weight of α-cellulose, the viscose solution having a filterability of above 175 ccm defined by the volume of the viscose solution filtered through a metal net filter according to N0071, USSR State Standard 3584-53, with 71 μm meshes and a diameter of 38 mm, under a pressure of 300 mm for 10 minutes.

* * * * *